(12) United States Patent
Cantu

(10) Patent No.: US 7,246,676 B2
(45) Date of Patent: Jul. 24, 2007

(54) VEHICLE SAFETY SYSTEM

(76) Inventor: Maria Dolores Cantu, 5991 Diamondback Dr., Brownsville, TX (US) 78526

( * ) Notice: Subject to any disclaimer, the term of this patent is extended or adjusted under 35 U.S.C. 154(b) by 1 day.

(21) Appl. No.: 11/155,205

(22) Filed: Jun. 17, 2005

(65) Prior Publication Data

US 2006/0015232 A1    Jan. 19, 2006

Related U.S. Application Data

(60) Provisional application No. 60/775,986, filed on Jul. 19, 2004.

(51) Int. Cl.
*B60R 21/00* (2006.01)
(52) U.S. Cl. ............... 180/268; 180/271; 180/274; 701/45
(58) Field of Classification Search ............... 180/268, 180/274, 289, 271, 282; 292/92, 93; 701/45; 49/352
See application file for complete search history.

(56) References Cited

U.S. PATENT DOCUMENTS

| | | | |
|---|---|---|---|
| 3,194,582 A | 7/1965 | Kutz | |
| 3,741,853 A * | 6/1973 | Usui et al. | ............... 428/63 |
| 4,162,715 A | 7/1979 | Coulombe | |
| 4,553,625 A * | 11/1985 | Tsuge et al. | ............... 180/268 |
| 5,094,501 A * | 3/1992 | Gersmann | ............... 296/155 |
| 5,165,498 A * | 11/1992 | Garboli et al. | ............... 180/268 |
| 5,318,145 A * | 6/1994 | Vollmer | ............... 180/274 |
| 5,497,641 A | 3/1996 | Linde et al. | |
| 5,574,315 A | 11/1996 | Weber | |
| 5,655,619 A * | 8/1997 | Suran et al. | ............... 180/270 |
| 5,765,660 A | 6/1998 | Ambrosi | |
| 5,799,516 A | 9/1998 | Zintler | |
| 6,081,758 A | 6/2000 | Parvulescu | |
| 6,428,049 B1 | 8/2002 | Nichols | |
| 6,922,622 B2 * | 7/2005 | Dulin et al. | ............... 701/45 |
| 6,938,921 B2 * | 9/2005 | Fisher | ............... 280/730.2 |
| 2002/0023797 A1 | 2/2002 | Baca | |
| 2002/0157313 A1* | 10/2002 | Fukazawa et al. | ............... 49/26 |
| 2003/0160497 A1 | 8/2003 | Darr | |

* cited by examiner

*Primary Examiner*—Paul N. Dickson
*Assistant Examiner*—Toan C. To
(74) *Attorney, Agent, or Firm*—Patterson & Sheridan, L.L.P.

(57) ABSTRACT

A safety system for a vehicle having a window actuator connected to a window system of the vehicle for moving a window to an open position, a door lock actuator connected to a door lock system of the vehicle for moving the door lock system to the unlocked position, a seat belt actuator connected to a seat belt release connector for disengaging the release connector from a first connector of a seat belt system, and a trigger in operational connection with the actuator. Wherein when the trigger is operated the system is substantially simultaneously actuated moving the window to the open position, moving the door lock system to the unlocked position, and disengaging the release connector from the first connector of the seat belt system.

20 Claims, 3 Drawing Sheets

VEHICLE SAFETY SYSTEM

RELATED APPLICATIONS

This application claims benefit of and priority to co-pending patent application Ser. No. 10/894,077 filed on Jul. 19, 2004 which was converted to provisional patent application Ser. No. 60/775,986.

FIELD OF THE INVENTION

The present invention relates in general to vehicle safety systems and more specifically to a system for substantially simultaneously unlocking doors, opening windows, and releasing the safety restraints of a vehicle.

BACKGROUND

Increasingly motor vehicles include powered windows and locks. Further, as required by law in many locations, more and more vehicle occupants are wearing their seat belts. While these systems are convenient and provide safety during vehicle accidents, these same devices can create a safety hazard after accidents and in certain emergency situations. Situations occur all to often where a vehicle loses power making it difficult, if not impossible, to lower the windows or unlock the doors to allow the occupants to exit as soon as possible. Additionally, it may be difficult to release the seat belt. In some situations, such as in the case of fire or when the vehicle has encountered water, exit time is of the essence. In these situations the ability to simultaneously release the safety restraints and provide exit options increases the odds of survival and may reduce the extent of injuries.

SUMMARY OF THE INVENTION

Therefore, it is a desire to provide a vehicle safety system that reduces the time for an occupant to exit a vehicle.

It is a further desire to provide a vehicle safety system that operates after the vehicle has lost its primary electrical source.

It is a still further desire to provide a system compatible with vehicles that have either manually operated windows and door locks or powered windows and door locks.

It is a still further desire to provide a vehicle safety system that may be added to existing vehicle systems.

Accordingly, a safety system for a vehicle is provided that enables an operator to release the seat belt and/or open the window and/or unlock a door by operation of a single trigger even if the vehicle's primary electrical system is inactive. The system may include a single actuator connected to the window system, door lock system, and the seat belt system. The system may include more than one actuator connected to one or more of the vehicle operating systems.

The foregoing has outlined the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

The foregoing and other features and aspects of the present invention will be best understood with reference to the following detailed description of a specific embodiment of the invention, when read in conjunction with the accompanying drawings, wherein.

DETAILED DESCRIPTION

Figure 4:
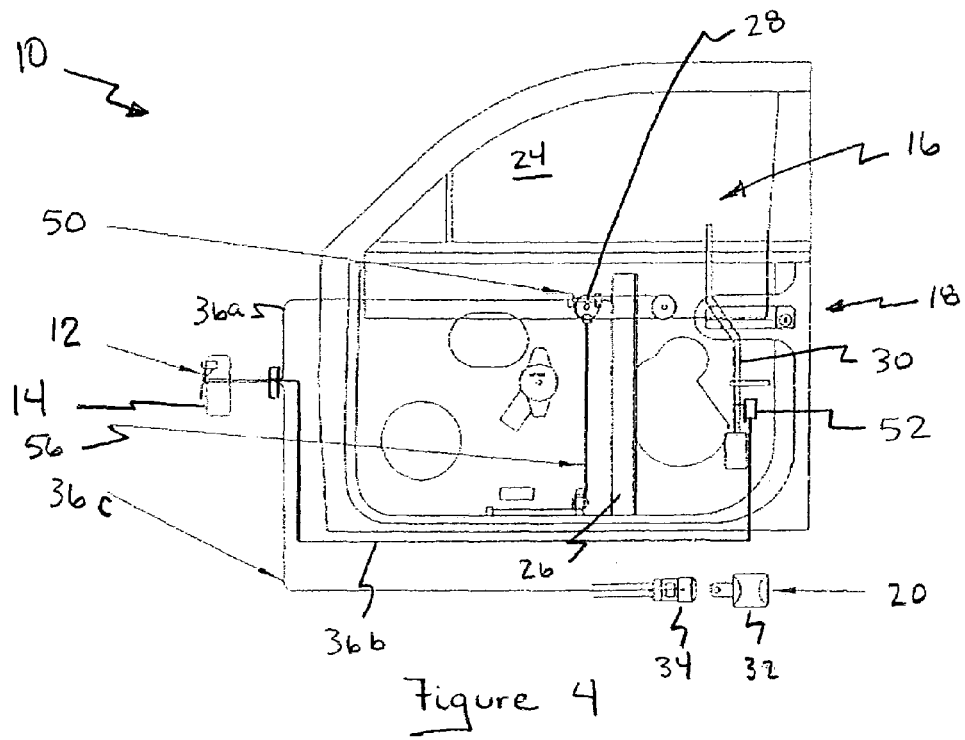
FIG. 4 is an illustration of another embodiment of a vehicle safety system of the present invention.

Refer now to the drawings wherein depicted elements are not necessarily shown to scale and wherein like or similar elements are designated by the same reference numeral through the several views.

Figure 1:
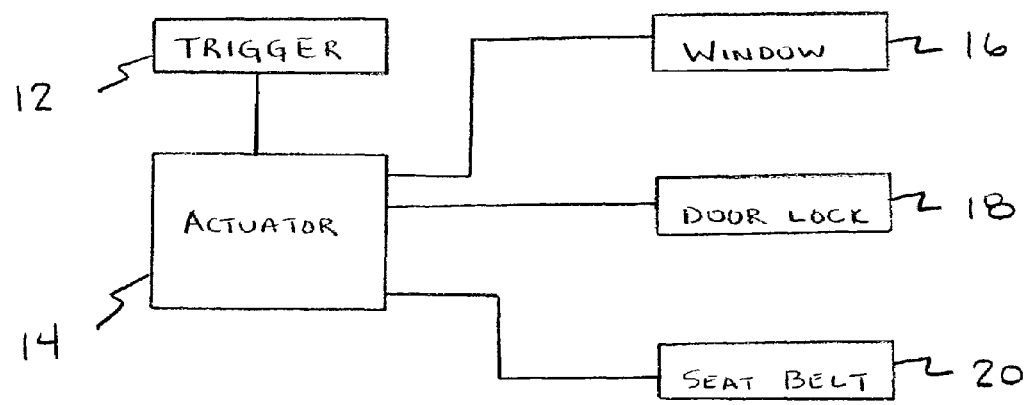
FIG. 1 is a diagram of an embodiment of the vehicle safety system of the present invention.

FIG. 1 is a diagram of an embodiment of the vehicle safety system of the present invention, generally denoted by the numeral 10. Vehicle safety system 10 includes a trigger 12, actuator 14, moveable window system 16, door lock system 18, and seat belt system 20. Trigger 12 is functionally connected to actuator 14 for operating window system 16 from the closed to the open position, door lock system 18 from the locked to unlocked position, and seat belt system 20 from the latched to unlatched position. Trigger 12 is desirably positioned in the interior of the vehicle wherein it is accessible by the driver of the vehicle. However, it should be recognizable that trigger 12 may be positioned in various locations in the interior or exterior of the vehicle. Desirably, at least one secondary trigger 12 is positioned exterior of the vehicle's passenger compartment for access by emergency personnel when the occupants are incapacitated. It should be further recognized that trigger 12 may be operationally connected with one or more sensors, such as, but not limited to, smoke, fire, water and collision sensors for automatic operation upon sensing that an emergency situation has occurred.

Actuator 14 may be a single mechanism or system in functional connection with all of the operated systems or a separate actuator 14 may be operationally connected to one or more of the operated systems. Actuator 14 may include, but is not limited to, electric and hydraulic motors and manually, electrically, pneumatic and hydraulically controlled pistons. Pneumatic and hydraulic systems will be generally referred to herein as pressurized systems.

Figure 2:
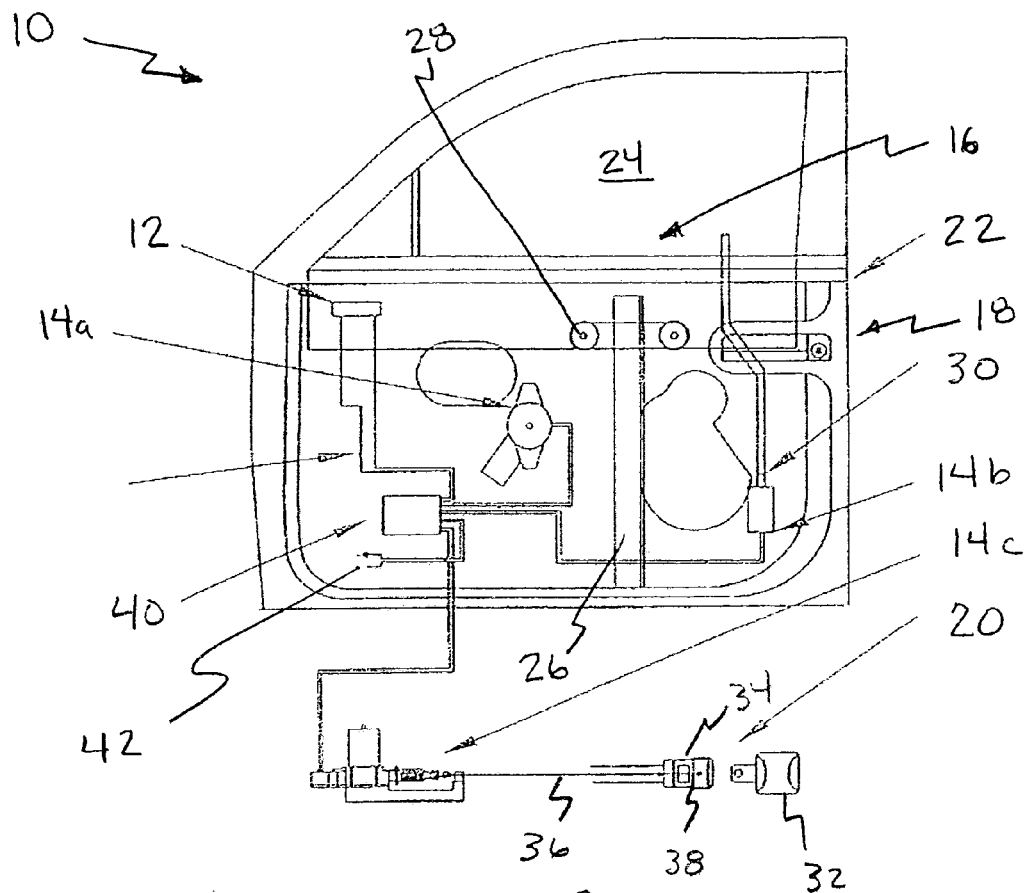
FIG. 2 is an illustration of an embodiment of an electrical vehicle safety system of the present invention.

FIG. 2 is an illustration of an embodiment of an electrical vehicle safety system 10 of the present invention in relation to a vehicle door 22. Actuator 14a is an electrical motor connected to window system 16. Window system 16 includes a window 24, window track 26, and pulleys 28. Actuator 14b is an electric motor connected to door lock system 18. Door lock system 18 includes a door lock linkage 30.

Seat belt system 20 includes a first connector 32 matable with a second belt release connector 34. Actuator 14c, a linear solenoid, is operationally connected to release connector 34 via a cable 36. Cable 36 has a first end 38 mechanically connected within release connector 34 such that when tension is applied release connector 34 releases first connector 32.

Trigger 12, an electrical switch, is electrically connected to actuators 14a, 14b, and 14c via a standby battery 40. Standby battery 40 is desirably rechargeably connected to the vehicle's primary battery or electrical system 42. In a preferred embodiment, standby battery 40 is encased in a watertight container to prevent shorting when the vehicle or the portion of the vehicle containing battery 40 is immersed in water.

Figure 3:
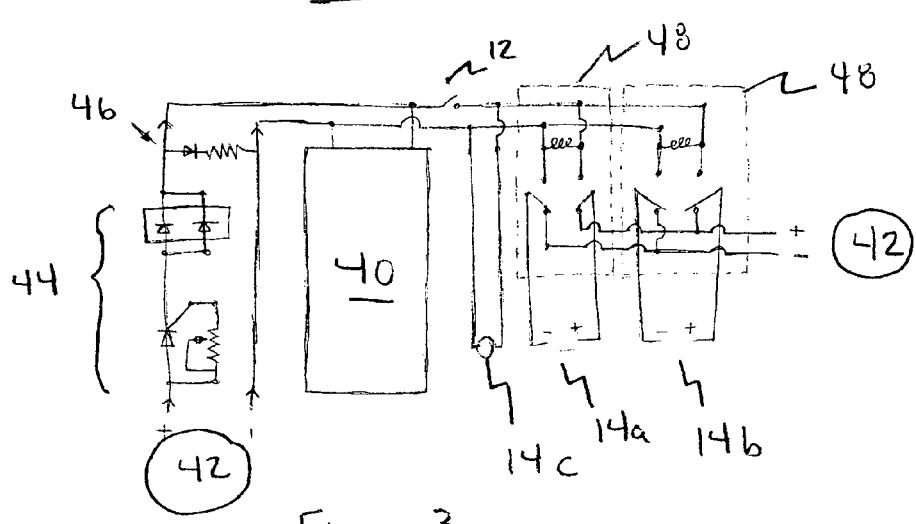
FIG. 3 is an electrical diagram of an embodiment of the vehicle safety system of FIG. 1.

FIG. 3 is an electrical diagram of vehicle safety system 10 of FIG. 1. Standby battery 40 is connected to primary electrical source 42 via a limit charger 44 to prevent overcharging of battery 40. Desirably a volt gauge 46 is connected for monitoring the status of battery 40. Battery 40 is operationally connected to actuators 14a, 14b, 14c via trigger 12 and relays 48. It may be desired for substantially all of the electrical components to water resistant.

Operation of vehicle safety system 10, as illustrated in FIGS. 1 and 2 is now described. Trigger or switch 12 is operated providing electricity to actuators 14a, 14b, and 14c. Upon actuation, actuator 14a operates window 24 to the open position. Actuator 14b operates door lock system 18 to the unlock position. Actuator 14c operates release connector 34, disconnecting first connector 32 from release connector 34. As can be seen, and with further reference to FIGS. 4 through 6, actuators 14a, 14b, and 14c may be replaced by a single actuator 14.

FIG. 4 is an illustration of another embodiment of vehicle safety system 10 of the present invention illustrating the use of a single actuator 14. Actuator 14 may be a linear piston or solenoid, operated manually, pneumatically, hydraulically, or electrically as described in relation to actuator 14c of FIGS. 1 and 2. The hydraulic or pneumatic embodiments would further include a fluid reservoir not shown. Trigger 12 is operationally connected to actuator 14 in a manner well known in the art. For example, if actuator 14 is electrically controlled, trigger 12 is a switch, if actuator 14 is manually operated, then trigger 12 may be a lever, and if actuator 14 is hydraulic or pneumatically operated, then trigger 12 may be a lever or button or other switch for injecting or releasing pressurized fluid in relation to actuator 14.

Actuator 14 is operationally connected to window system 16 by a cable 36a via window release 50. Actuator 14 applies a force via cable 36a to disengage window 24 from track 26. A biasing mechanism 56 such as, but not limited to, a spring may be connected to window 24, urging window 24 to the open position. Biasing mechanism 56 serves to move window 28 to the open position when the vehicle is upside down or at an angle wherein gravity will not move window 24 to the open position once it is disengaged from track 26.

Actuator 14 is operationally connected to door lock system 18 by cable 36b via lock release connector 52. Actuator 14 is connected to seat belt system 20 by cable 36c as described with reference to FIGS. 2 and 4.

Figure 5:
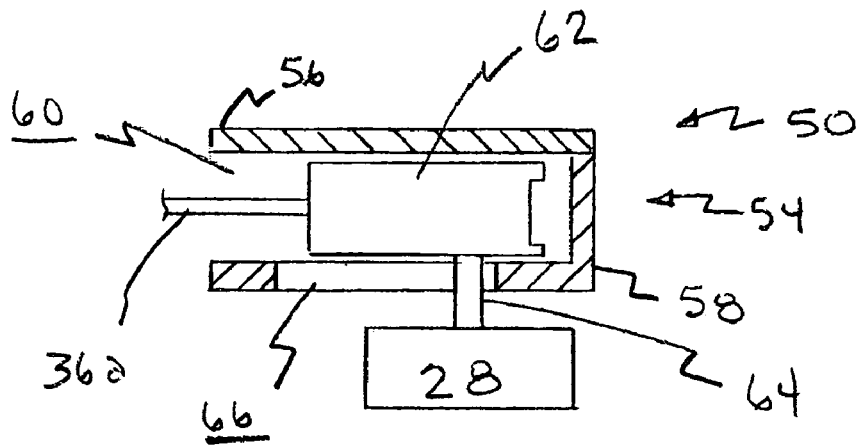
FIG. 5 is a cross-sectional view of an embodiment of the window release connector shown in FIG. 4.

FIG. 5 is a cross-sectional view of an embodiment of window release connector 50 illustrated in FIG. 4. Release connector 50 includes a housing 54 having a first section 56 and a second section 58. Housing 54 defines a chamber 60 moveably disposing a sliding member 62. A shaft 64 extends from sliding member 62 through a longitudinal slot 66 formed through a portion of second section 58 of housing 50. Shaft 64 is connected to a pulley 28 of window system 16 (FIG. 4). Cable 36a is connected to sliding member 62.

Figure 6:
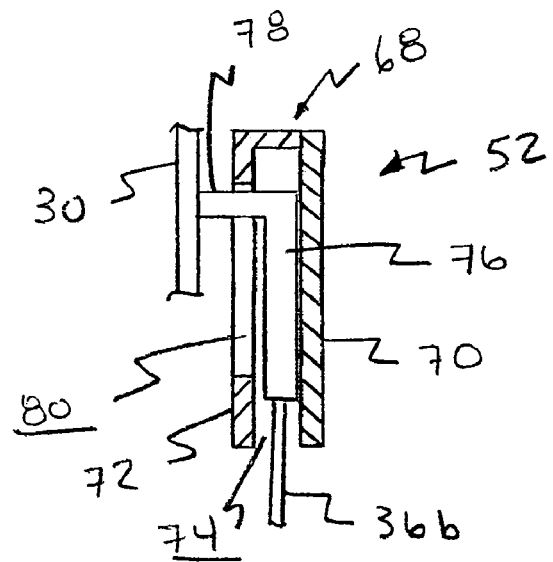
FIG. 6 is a cross-section view of an embodiment of the door lock release connector shown in FIG. 4.

FIG. 6 is a cross-section view of an embodiment of door lock release connector 52 shown in FIG. 4. Lock release connector 52 includes a housing 68 having a first section 70 and a second section 72 defining a chamber 74. A sliding member 76, having a shaft 78, is moveably disposed within chamber 74. Shaft 78 extends through a longitudinal slot 80 formed through second section 72 and is connected to door lock linkage 30 (FIG. 4).

With reference to FIGS. 1 through 6, operation of vehicle safety system 10 of the present invention is described. The vehicle includes a window system 16, a door lock system 18, and a seat belt system 20. An actuator 14 is operationally connected to one or more of window system 16, door lock system 18, and seat belt system 20. Trigger 12 is operationally connected to actuator 14 such that when trigger 12 is operated, actuator 14 actuates, disengaging window 24 from track 26 freeing window 24 to be moved to the open position by gravity and/or biasing mechanism 56, operating door lock system 18 to the unlocked position, and operating seat belt system 20 to the unlatched position by disengaging first seat belt connector 32 from release connector 34. As illustrated system 10 may include a single actuator 14 connected to all of the operated systems or individual actuators for each operated system. Vehicle system 10 may include manual, electric, pneumatic, or hydraulic actuators 14 or a combination of actuators.

From the foregoing detailed description of specific embodiments of the invention, it should be apparent that a vehicle safety system that is novel and unobvious has been disclosed. Although specific embodiments of the invention have been disclosed herein in some detail, this has been done solely for the purposes of describing various features and aspects of the invention, and is not intended to be limiting with respect to the scope of the invention. It is contemplated that various substitutions, alterations, and/or modifications, including but not limited to those implementation variations which may have been suggested herein, may be made to the disclosed embodiments without departing from the spirit and scope of the invention as defined by the appended claims which follow.

What is claimed is:

1. A safety system for a vehicle, the system comprising:
   an actuator operationally connected to a window system, the window system including a window and a window track; and
   a trigger operationally connected to the actuator;
   wherein when the trigger is operated the actuator is actuated disengaging the window from the window track in a manner such that the window is movable to an open position.

2. The system of claim 1, further including:
   a biasing mechanism in connection with the window urging the window toward the open position.

3. The system of claim 1, wherein the actuator is operationally connected to the window system by a cable to a pulley of the window system.

4. The system of claim 3, further including a window release connector comprising:
   a housing having a chamber a longitudinal slot formed through a section of the housing in connection with the chamber; and
   a sliding member connected to the pulley and the cable, the sliding member being moveably disposed in the chamber.

5. The system of claim 3, further including:
   a biasing mechanism in connection with the window urging the window toward the open position.

6. The system of claim 4, further including:
   a biasing mechanism in connection with the window urging the window toward the open position.

7. The system of claim 5, wherein the actuator is further operationally connected to a door lock system, wherein when the actuator is actuated, the door lock system is moved to an unlocked position substantially simultaneously with the window being moved to the open position.

8. The system of claim 2, wherein the actuator is further operationally connected to a door lock system, wherein when the actuator is actuated, the door lock system is moved to an unlocked position substantially simultaneously with the window being moved to the open position.

9. The system of claim 1, wherein the actuator is further operationally connected to a door lock system, wherein when the actuator is actuated, the door lock system is moved to an unlocked position substantially simultaneously with the window being moved to the open position.

10. The system of claim 9 wherein the actuator is powered by one of electricity, air pressure, or hydraulic pressure.

11. The system of claim 1, wherein the actuator is further operationally connected to a seat belt system, wherein when the actuator is actuated, the seat belt system is operated to an unlocked position.

12. The system of claim 11, further including:
a biasing mechanism in connection with the window urging the window toward the open position.

13. The system of claim 11 wherein the actuator is powered by one of electricity, air pressure, or hydraulic pressure.

14. The system of claim 1, wherein:
the actuator is further operationally connected to a door lock system; and
the actuator is further operationally connected to a seat belt system;
wherein upon operation of the trigger the actuator is actuated substantially simultaneously moving the window to the open position, moving the door lock system to an unlocked position, and actuating the seat belt system to an unlatched position.

15. The system of claim 14, further including:
a biasing mechanism in connection with the window urging the window toward the open position.

16. The system of claim 15 wherein the actuator is powered by one of electricity, air pressure or hydraulic pressure.

17. The system of claim 14 wherein the actuator is powered by one of electricity, air pressure, or hydraulic pressure.

18. The system of claim 1, wherein the actuator is powered by one of electricity, air pressure, or hydraulic pressure.

19. A safety system for a vehicle, the system comprising:
an actuator operationally connected to a seat belt system, the seat belt system including a first connector engageable with a release connector;
a trigger operationally connected to the actuator; wherein when the trigger is operated the actuator is actuated disengaging the first connector from the release connector;
a door lock system operationally connected to the actuator, wherein when the actuator is actuated the door lock system is moved to an unlocked position substantially simultaneously with the seat belt system being actuated to an unlatched position; and
a door lock release connector comprising:
a housing having a chamber, longitudinal slot formed through a section of the housing in connection with the chamber; and
a sliding member moveably disposed in the chamber, the sliding member connected to a linkage of the door lock system and to the actuator by a cable.

20. The system of claim 19 wherein the actuator is powered by one of electricity, air pressure, or hydraulic pressure.

* * * * *